United States Patent [19]
Claassen

[11] 3,871,857
[45] Mar. 18, 1975

[54] APPARATUS FOR PRESS BENDING GLASS SHEETS

[75] Inventor: George R. Claassen, New Kensington, Pa.

[73] Assignee: PPG Industries, Inc., Pittsburgh, Pa.

[22] Filed: Feb. 19, 1974

[21] Appl. No.: 443,288

[52] U.S. Cl. .................. 65/273, 65/275, 65/289
[51] Int. Cl. ............................................ C03b 23/02
[58] Field of Search ............ 65/106, 273, 275, 287, 65/289, 374

[56] References Cited
UNITED STATES PATENTS
3,367,764  2/1968  Seymour ........................ 65/273 X
3,531,276  9/1970  Richardson ..................... 65/273 X Primary Examiner—Arthur D. Kellogg
Attorney, Agent, or Firm—Edward I. Mates; Thomas F. Shanahan

[57] ABSTRACT

A press bending mold having a flexible metal shaping member such as a plate or a frame, a reinforcing grate and adjustable attachment means extending through certain apertures in the reinforcing grate to adjust the shape of the metal shaping member.

6 Claims, 5 Drawing Figures

APPARATUS FOR PRESS BENDING GLASS SHEETS

BACKGROUND OF THE INVENTION

The present invention relates to shaping glass and particularly to an appratus for apparatus glass sheets by a press bending operation which apparatus is relatively inexpensive to fabricate, yet capable of producing bent glass sheets on a mass-production basis within precise tolerances. Though the present invention originated to solve problems existing in the shaping of glass sheets, it is understood that the principles of the present invention may be employed for shaping sheet material other than glass when the sheet material is softened sufficiently for shaping.

Glass sheets or plates have been bent by supporting the sheet to be bent between a pair of glass shaping members while at a temperature sufficiently high to be deformable by pressurized contact between a pair of glass shaping members having major, complementary shaping surfaces conforming to the shape desired for the bent glass. In the past, the glass shaping members were of either solid metal or refractory members.

Glass shaping members fabricated of solid metal are costly to fabricate. The fabricated parts are not suitable to produce patterns other than the one for which they are originally made, except for the family of glass sheets of uniform radius of curvature but of different sizes. Furthermore, an expensive and time consuming grinding operation is needed to correct the shape of any high spots on the shaping surface and it is necessary to grind a considerable portion of the shaping surface to correct for any low spot relative to the shaping surface of the shaping member.

U.S. Pat. No. 3,367,764 to Seymour provides glass shaping apparatus of the press bending type that is easily adjustable to change its shape without requiring grinding of the shaping surface in the event glass is bent slightly out of tolerance without requiring dismantling of the entire apparatus, and that is capable of simple adjustment to produce several different configurations that are not too dissimilar from one another.

Each glass shaping member of an illustrative embodiment of the apparatus patented to Seymour comprises a relatively flexible shaping plate of metal having a pressing face whose shape approximates that of the shape desired for the glass sheet after bending. The relatively flexible shaping plate extends substantially continuously throughout substantially its entire extent and has sufficient rigidity to resist deformation during pressurized engagement against a heat-softened glass sheet.

The patented apparatus also comprises a relatively rigid member in the form of a rigid, more massive metal plate having an area at least substantially coextensive with that of the relatively flexible metal plate located in spaced relation behind said relatively flexible metal plate and of a thickness of approximately ½ inch. Attachment means is distributed throughout the extent of the relatively flexible metal plate and the relatively rigid metal plate for connecting the plates in spaced relation to one another, for insuring positive alignment of the central portion of the shaping plate to the corresponding portion of the rigid plate while permitting the shaping plate to expand thermally without distorting from its desired local configuration, and for making slight alterations in the shape of the relatively flexible metal plate without altering the configuration of the relatively rigid metal plate. The space between the shaping plate and the rigid plate permits access to adjust the attachment means. Such adjustment changes the local contour of the shaping plate by altering the distance between the shaping plate and the rigid plate in the vicinity of the attachment means that is adjusted.

In the fabrication of adjustable press bending apparatus of the type patented by Seymour in the above-mentioned patent, one end of each attachment means is rigidly attached to the rear surface of the flexible metal plate while the other end portion extends through an opening in the relatively rigid plate and is secured to said plate by adjustable securing members, each comprising a threaded shaft extending through an opening in the rigid plate and adjustment nuts threaded onto the shaft on each side of the rigid metal plate.

The holes drilled in the rigid metal plate to receive the end portions of the attachment means are located in proper alignment with the locations where the adjustable securing members are secured to the rear face of the flexible metal plate whose pressing face has a shape that conforms to a particular pattern. However, these locations of the holes in the rigid plate may be unsuitable for use with a flexible metal plate whose pressing face has a shape that conforms to another pattern. Hence, when production requirements for a particular pattern are ended and production begun on a new pattern, it becomes necessary to store the flexible metal plate with the rigid metal plate until the production program requires producing the particular pattern again. Storage space becomes a problem in a plant producing many different patterns of curved glass windows for autos and other uses. Furthermore, the cost of the relatively massive rigid metal plates adds considerably to the cost of the inventory of press bending members that must be stored when not in use. Also, the mass of the rigid metal plates necessary to insure sufficient rigidity to insure that the flexible metal plates rather than the rigid metal plates change their shape when the attachment means are adjusted must necessarily be so great as to impose a burden on the apparatus that actuates the press bending members to move between a retracted position and a glass engaging position. Hence, the maximum speed at which the press bending members move between these positions must be controlled to limit inertia problems. This may increase the time needed for each bending cycle, thus reducing the rate at which bent glass sheets can be produced successfully.

SUMMARY OF THE INVENTION

The present invention provides a press bending apparatus particularly suitable for use in shaping heat-softened glass sheets that has an adjustable press face as in the Seymour patent, but is lighter in weight and has a rigid member adapted for use with several different flexible metal plates whose shapes conform approximately to different production patterns. Storage space needed for unused press bending members is reduced considerably and the total mass of the press bending member (relatively flexible metal plate with the press face plus that of the relatively rigid reinforcing member and attachment means) is considerably less than that of a similar press bending apparatus conforming to the Seymour patent. These benefits are obtained by using an open grate instead of a heavy plate as a reinforcement for the relatively flexible plate provided with the press face.

The use of a metal grate as a reinforcing member for an adjustable shaping plate avoids the need for punching holes in the reinforcing plates to receive the adjustable attachment means that attach the rigid member to a shaping plate or frame and those needed to receive the mounting bolts that attach the rigid plate to a mounting plate, which latter plate is attached to move with a piston rod. Furthermore, adjusting the press face is easier with a reinforcing grate rather than a solid reinforcing plate because an operator can see what he is doing more easily through the apertures of a grate when he adjusts the shaping face of a press bending member provided with a grate rather than a solid plate as its reinforcing member. Furthermore, it is unnecessary to dismount the reinforcing grate together with the shaping plate from attachment to the mounting plate whenever production changes require a change in the flexible metal shaping plate. It is only necessary to remove the flexible metal shaping plate conforming to the old production pattern from the grate and attach a flexible metal shaping plate conforming to the new production pattern to the grate, which latter remains permanently attached to the mounting plate attached to the actuating piston.

In order to understand fully the present invention, a description of a particular embodiment thereof will now be described.

BRIEF DESCRIPTION OF THE DRAWINGS

In the drawings which form part of the description of this illustrative embodiment and wherein like reference numerals refer to like structural elements.

DESCRIPTION OF PREFERRED EMBODIMENT

Figure 2:
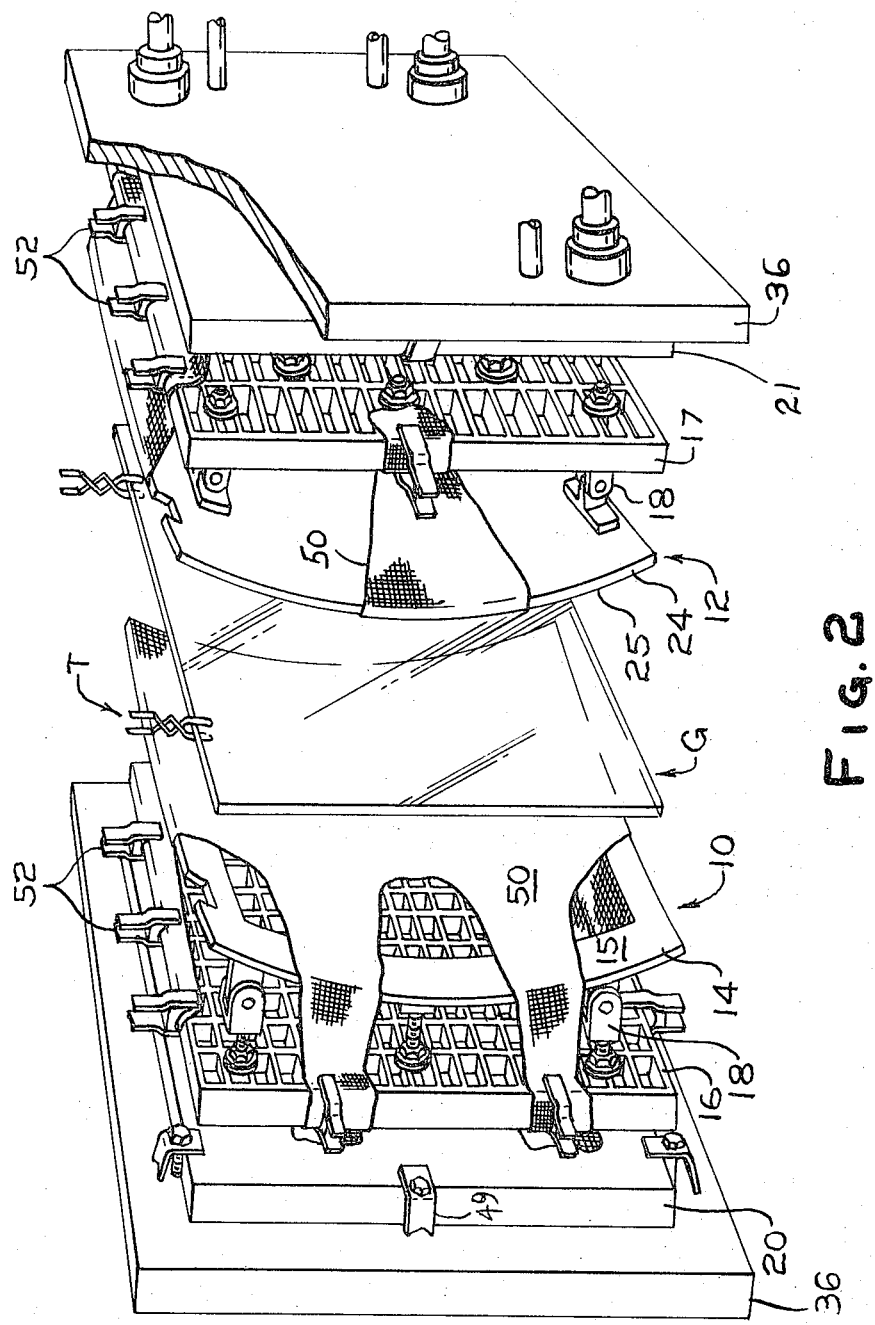
FIG. 2 is a fragmentary, perspective view of the apparatus of FIG. 1 showing two embodiments of typical press bending members in opposing relation to one another, with certain parts omitted to show other parts more clearly.
Figure 3:
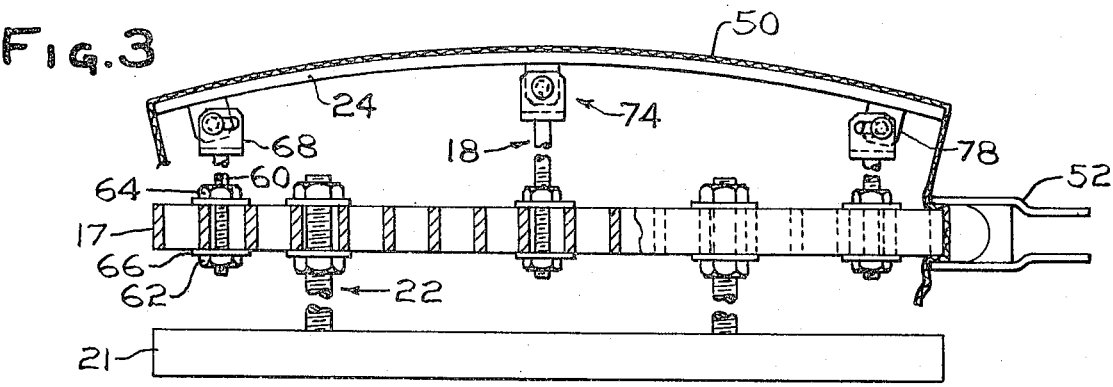
FIG. 3 is an enlarged, fragmentary, end view of a portion of a press bending member with the cover and certain parts removed to show other parts in section.
Figure 4:
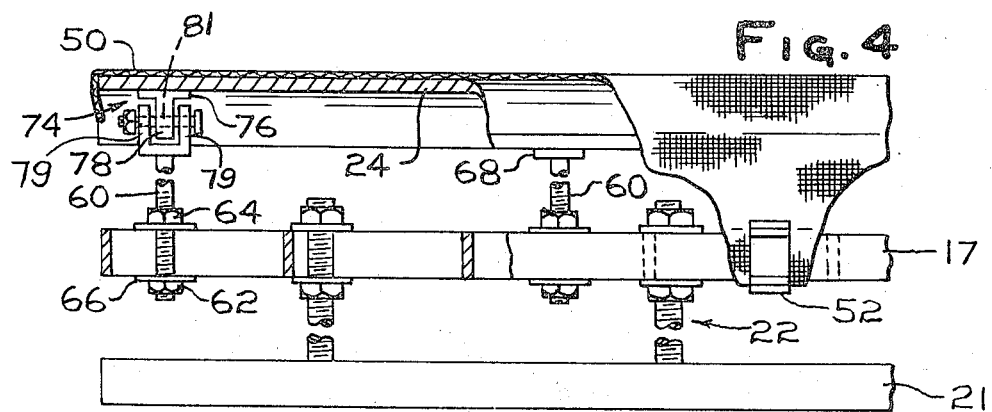
FIG. 4 is an enlarged, fragmentary end view taken at right angles to the view of FIG. 3 with parts omitted to show other parts in section.
Figure 5:
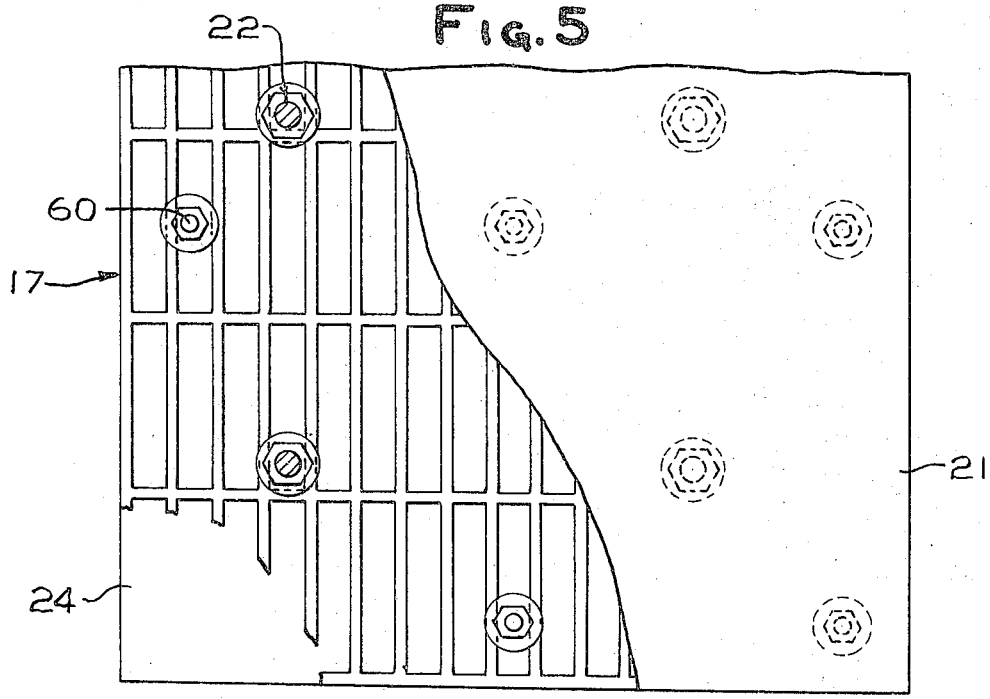
FIG. 5 is a fragmentary, enlarged plan view of the portion of the press bending apparatus depicted in FIGS. 3 and 4, also with parts omitted, showing the mold construction according to the present invention.

The glass shaping apparatus illustrating the present invention comprises a concave shaping member 10 and a convex shaping member 12. As seen in FIG. 2, the concave shaping member 10 comprises a relatively flexible shaping frame 14, having a concave shaping surface 15 facing forward in one direction. A relatively rigid member in the form of a metal grate 16 is disposed in spaced relation behind the shaping frame 14 by means of a series of attachment means 18 distributed throughout the marginal portion of the grate to connect the grate 16 to the shaping frame 14. A rigid back plate 20 is connected in spaced relation to the rigid metal grate 16 by a plurality of rigid, elongated, adjustable connectors 22 in the form of mounting bolts.

The convex shaping member 12 comprises a relatively flexible shaping plate 24 having a shaping surface 25 complementary to that of the shaping frame 14 of the concave shaping member 10. A relatively rigid member in the form of another metal grate 17, attachment means 18 connecting the relatively rigid metal grate 17 to the rear of and in spaced relation to shaping plate 24, a rigid back plate 21 and connecting means 22 connecting the rigid back plate 21 to the relatively rigid metal grate 17 are associated with the convex shaping member 12 in a manner similar to how the like elements are associated with the concave shaping member 10.

Figure 1:
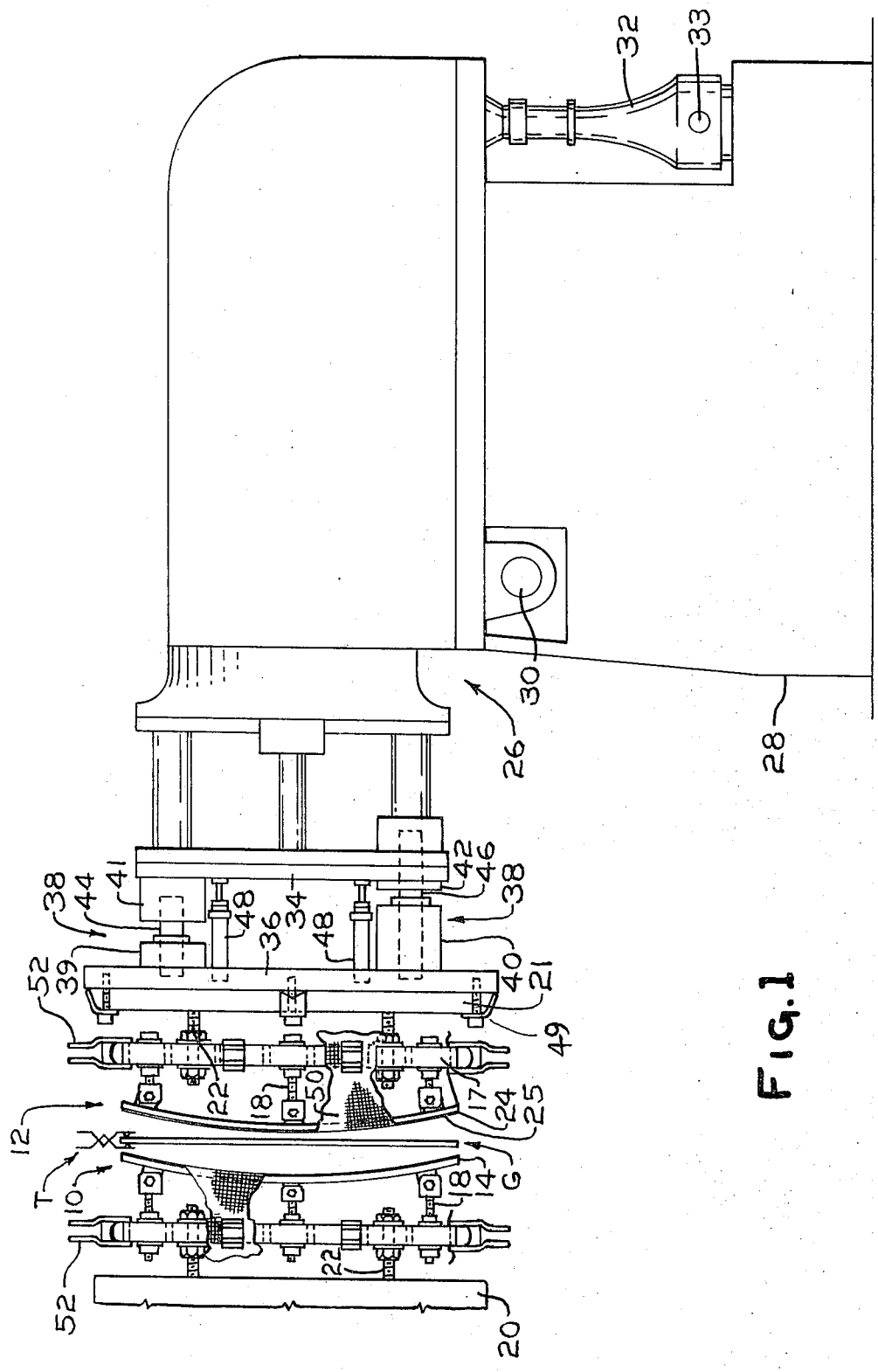
FIG. 1 is a fragmentary end elevation of an embodiment of the invention showing one mold or press bending member of press bending apparatus and its reinforcing metal grate attached to a mold actuating means and sufficient structure of an opposing mold or press bending member to indicate how a pair of opposing press bending members are positioned relative to one another.

A piston assembly 26 shown in FIG. 1 attached to the rear of convex shaping member 12 is provided for each of the shaping members 10 and 12. Each piston assembly 26 is supported on a piston support structure 28. The shaping member 10 or 12 and its attached piston assembly 26 is pivotally mounted about a horizontal pivot 30. A vertically adjustable piston 32 whose housing is pivotally mounted to the piston support 28 at pivot 33 supports the rear end of piston assembly 26. Vertical adjustment of piston 32 permits the entire shaping member and its actuating piston assembly 26 to pivot with respect to the axis of pivot 30 to orient the shaping members in a manner well known in the art. This enables the shaping surface of the member to be oriented to any angle desired with respect to the vertical plane in which a glass sheet G is suspended from tongs T for the shaping operation.

The front end of the piston assembly 26 is attached to a piston actuated plate 34. The latter is aligned with a piston plate 36 through a plurality of alignment couplings 38. The alignment couplings 38 between plates 34 and 36 comprise guide blocks 39 and 40 attached to the rear of plate 36 and guide blocks 41 and 42 aligned axially with guide blocks 39 and 40, respectively, and attached to the front surface of plate 34. Rods 44 extend loosely between aligned guide blocks 39 and 41, while rods 46 extend loosely between aligned guide blocks 40 and 42. A spring loaded coupling 48 is connected between the piston actuated plate 34 and the piston plate 36 in the vicinity of each alignment coupling 38.

Perpherally spaced attachment means 49 secure rigid back plates 20 and 21 to the piston plates 36. This enables the shaping members 10 and 12 to move relative to one another and an interposed glass sheet G when pistons 26 are actuated.

Each shaping member is provided with a cover 50 in direct contact with the shaping surface 15 or 25. The cover 50 is preferably of a material that does not harm glass at elevated temperatures. Preferably, the material for the cover is a strechable fiber glass cloth composed of texturized yarns. A number of closely spaced clamps 52 are mounted around the periphery of the relatively rigid metal grate 16 or 17 to clamp the cover 50 in position where it is in unwrinkled condition against the shaping surface 15 or 25 which it covers.

While the present invention is susceptible of making slight modifications in the shaping surface by changing the contour of the relatively flexible shaping frame 14 and shaping plate 24, it is also desirable to provide means for rapidly changing from one glass shaping member to another when the pattern to be manufactured differs radically from one previously manufactured. This rapid change is accomplished by providing easy access for a tool to reach each attachment means 18 to facilitate the removal of shaping frame 14 from one shaping member 10 and the removal of its complementary shaping plate 24 from the other shaping member 12 and to replace the shaping frame 14 and shaping plate 24 of one pattern with corresponding elements of different shape of a different pattern.

Each attachment means 18 comprises a threaded rod 60 having its rearward end extending through an opening in a grate 16 or 17. An adjustment nut 62 is screwed onto the threaded rod 60 behind the grate while another adjustment nut 64 is screwed onto the threaded rod 60 in front of the grate. Washers 66 are provided on each side of the grate. The front end of the threaded rod 60 is secured to a clevis 68. The latter, in turn, is pivotally attached to an apertured stem 78 of a T-shaped member 74 whose head 76 is rigidly attached to the rear surface of the frame 14 or shaping plate 24. The clevises 68 are provided with apertured walls 79 having aligned apertures that receive a pin 81 extending through stem 78. Some of the walls 79 are provided with aligned slots to permit certain T-shaped members 74 to move in response to thermal expansion of the shaping plate 24 as explained in detail in the Seymour U.S. Pat. No. 3,367,764.

The grates 16 and 17 are rigidly attached to back plates 20 and 21, respectively, by mounting bolts 22 having threaded nuts fixed therearound in front of and behind a grate 16 or 17. The openings throughout the grates make it easy for an operator to observe what he is doing when he adjusts a shaping frame or shaping member relative to its attached grate or when he replaces a shaping frame or shaping member relative to its attached grate.

Each grate is composed of bars one inch wide and 3/16 inch thick arranged in parallel relation to one another to form rectangular openings about ¾ inch wide and 4 inches long. The grates are permanently attached to the back plates and the shaping frame 14 or shaping plate 24 is readily removed from the grate by rotating adjustment nuts 62 in the proper direction. A replacement shaping frame 14 or shaping plate 24 is then attached to the grid by inserting the various threaded rods 60 extending from the rear of the replacement shaping plate or replacement shaping frame through appropriate rectangular openings, applying washers 66 and an adjustment nut 62 to each threaded rod 60 until the replacement shaping frame or replacement shaping plate is in position relative to the grate 16 or 17.

The threaded rods 60 are of sufficient length so that the grate is spaced about 6 inches behind the shaping plate or shaping frame. Also, the mounting bolts 22 are of sufficient length to space the grate 16 or 17 about 6 inches in front of the back plate 20 or 21. Thus, sufficient space is provided to insert a wrench needed to adjust the nuts 62 and 64 whenever the shaping plate 24 needs fine adjustment. Of course, access to the nuts is facilitated to provide removal and replacement as well.

In an illustrative embodiment of the present invention, the metal shaping plate 24 or shaping frame 14 is ¼ inch thick and the metal grates 16 and 17 are oriented to have a thickness of one inch in the direction of movement of the shaping members 10 and 12 compared to a typical thickness of a solid reinforcement plate of ½ inch, or twice the thickness of the shaping plate in the prior art. The thickness of the grate should be more than three times that of the shaping plate or frame to provide rigidity previously obtained by a solid reinforcement plate having twice the thickness of the shaping plate because of the rectangular openings throughout the grid. However, the open area of the grid should be sufficient to provide a rigid structure having less mass per unit area than a solid plate of lesser thickness, such as half the thickness, of the grate.

The form of the invention shown and described in this disclosure represents a preferred illustrative embodiment thereof that reduces the mass per square foot of a reinforcing rigid member by about 9 pounds when the grate replaces a solid metal plate. It is understood, however, that various changes may be made without departing from the gist of the invention as defined in the claimed subject matter that follows.

I claim:

1. In apparatus for press bending a heat-softened glass sheet by pressurized engagement thereagainst comprising:
    1. a metal plate deformable in the direction of its thickness and having a shaping surface whose shape approximates that of the shape desired for the glass sheet after bending and having sufficient rigidity to resist deformation during pressurized engagement against a heat-softened glass sheet,
    2. a relatively rigid member more rigid than said metal plate located in spaced relation behind and in facing relation to said metal plate, and
    3. adjustable attachment means distributed in spaced relation throughout the area of said metal plate and said relatively rigid member by which the shape of said metal plate may be altered, the improvement wherein said relatively rigid member comprises a metal grate with a plurality of elongated openings therein, said adjustable attachment means are attached to the rear surface of said metal plate and each have a portion that extends through a selected one of said elongated openings of said grate, said portions being of a dimension to permit lateral and longitudinal movement of said attachment means within said selected one of said openings, and means disposed on each side of said grate to engage therewith and with each said adjustable attaching means to adjust the position of said adjustable attaching means along said elongated openings and lengthwise relative to said grate to alter the shape of said metal plate.

2. The improvement as in claim 1, wherein said adjustable attachment means comprises threaded shafts each extending through an opening in said grate and said means engageable with said adjustable attachment means comprises a pair of adjustment nuts threadedly engaging said shaft and located on opposite sides of said grate.

3. The improvement as in claim 1, further includes a plunger for actuating said apparatus between a retracted position and a glass engaging position, a rigid mounting plate attached to said plunger, means to attach said rigid mounting plate to said grate in spaced relation behind said grate, said last named space providing access for adjusting said attaching means for connecting said rigid mounting plate and said grate.

4. The improvement as in claim 1, wherein said deformable metal plate is in the form of a frame.

5. The improvement as in claim 1, wherein said deformable metal plate is in the form of a solid plate.

6. The improvement as in claim 1, wherein said grate has an open area sufficient to provide less mass per unit area than that of a solid plate having half the thickness of that of said grate.

* * * * *